Nov. 21, 1950

A. G. GURRIES 2,530,577

FRONT END IMPLEMENT SUPPORTING
AND ADJUSTING MECHANISM

Filed April 9, 1945

INVENTOR.
A. G. Gurries

BY

*Webster & Webster*
ATTYS

Patented Nov. 21, 1950

2,530,577

UNITED STATES PATENT OFFICE 2,530,577

FRONT END IMPLEMENT SUPPORTING AND ADJUSTING MECHANISM

Albert G. Gurries, Gilroy, Calif., assignor to Be-Ge Manufacturing Co., Gilroy, Calif., a corporation of California Application April 9, 1945, Serial No. 587,276

1 Claim. (Cl. 254—139.1)

The present invention is directed to, and it is an object to provide, a novel supporting and actuating mechanism for a vertically adjustable front end implement on a tractor; the implement in the present embodiment being a push grader or bulldozer.

Another object of the invention is to provide a mechanism, as above, which includes fluid pressure operated power cylinders as the implement adjusting means; said power cylinders being arranged on the tractor in unique assembly.

An additional object of the invention is to provide a front end implement supporting and adjusting mechanism which embodies a minimum of moving parts on the tractor, and from which mechanism the implement may be readily detached for other and separate use of the tractor; the parts which remain on the tractor having no tendency to swing about or interfere with tractor operation.

A further object of the invention is to provide a front end implement supporting and adjusting mechanism which does not obstruct the operator's forward view to any material extent.

An additional object of the invention is to provide a front end implement supporting and adjusting mechanism which includes therein an effective tractor radiator protecting grill or shield.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views.

Figure 1:
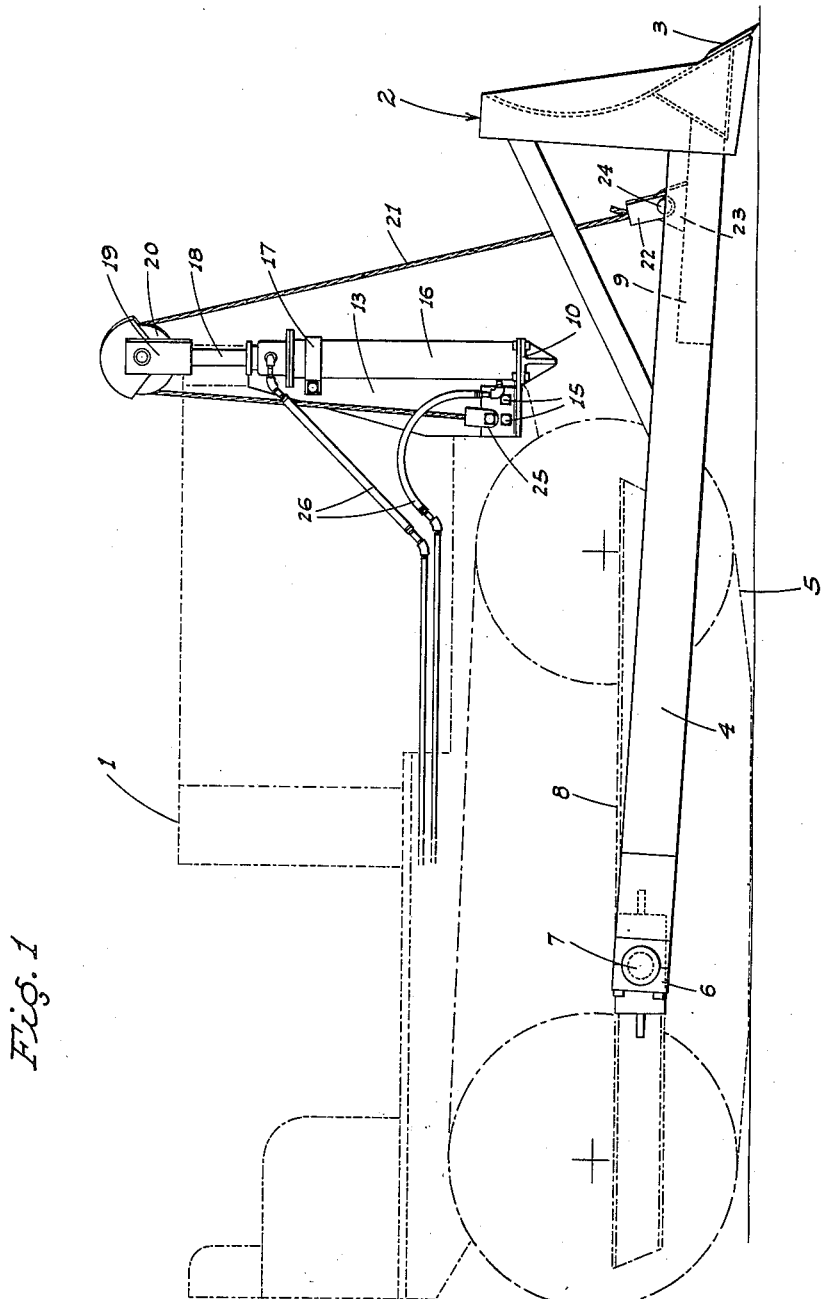
Figure 1 is a side elevation of a tractor and push grader assembly, including the novel supporting and adjusting mechanism for the implement.
Figure 2:
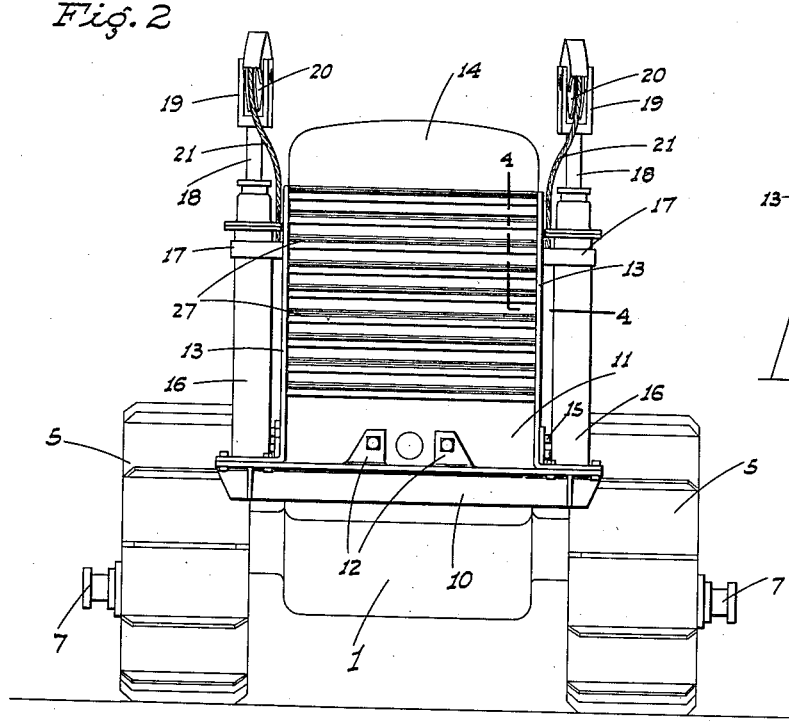
Figure 2 is a front end view of the tractor and said mechanism, with the implement removed.
Figure 4:
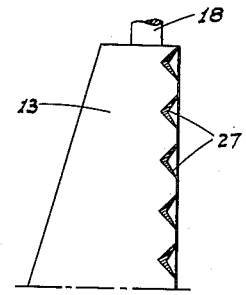
Figure 4 is a fragmentary cross section on line 4—4 of Fig. 2.
Figure 3:
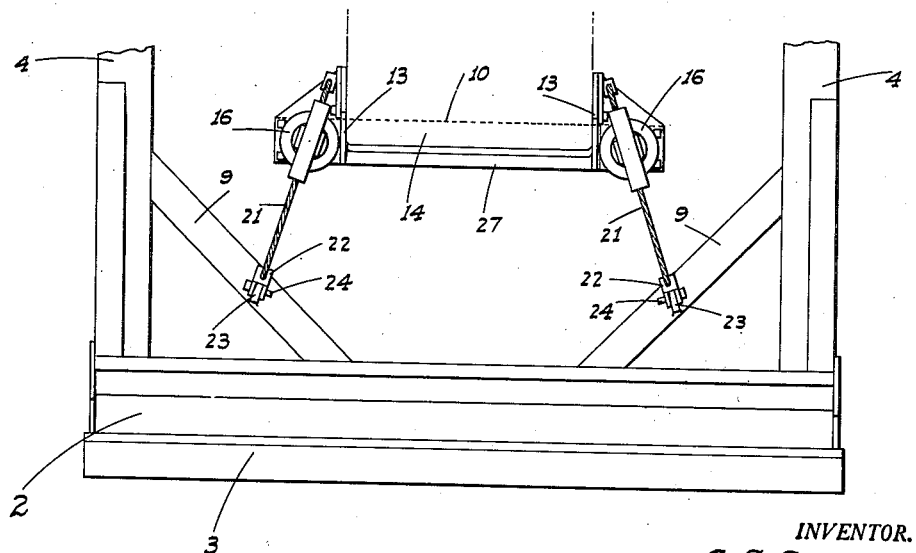
Figure 3 is a fragmentary plan view of a tractor and push grader assembly, including said mechanism.

Referring now more particularly to the characters of reference on the drawings, the numeral 1 indicates generally a tractor having a push grader 2 assembled therewith; said push grader being a rigid type and including a vertically adjustable blade 3 disposed transversely ahead of the tractor, and transversely spaced push beams 4 which extend rearwardly alongside the tracks 5 of the tractor. At their rear ends the push beams are detachably coupled, as at 6, to rigid trunnions 7 which project laterally out from the track frames 8 intermediate the ends of the latter. Diagonal braces 9 connect between the blade 3 and the push beams 4.

The above push grader is substantially conventional, and is supported at the forward end, and for power controlled vertical adjustment, by means of the following mechanism which embodies the essence of this invention:

A heavy duty, horizontal cross beam 10 is secured to the front end member 11 of the tractor frame and projects beyond opposite sides thereof; said cross beam 10 being connected to said end member by means of attachment ears 12. A transversely spaced pair of vertical, laterally facing plates 13 are rigidly mounted on and upstand from the cross beam 10 closely adjacent but to the sides of the radiator 14 of the tractor; said plates being also secured to the adjacent end of member 11 by means of bolts 15.

A pair of vertical, fluid pressure actuated power cylinders 16, of double acting type, are mounted on the cross beam 10 at the ends thereof adjacent and to the outside of the plates 13; said cylinders being secured at the lower ends to said cross member, and attached intermediate their ends to the plates 13 by tie straps 17.

The plungers or piston rods 18 of cylinders 16 extend upwardly from the latter, and at the upper ends said rods have forks 19 in which hooded sheaves 20 are journaled.

A cable 21 extends over each sheave 20 and depends therefrom both to the front and rear of the corresponding power cylinder 16. At the lower end of the front reach of each cable it is detachably connected by a clevis 22 to an ear 23 upstanding from the adjacent diagonal brace 9 by means of a removable cross pin 24. At the lower end of the rear reach of each cable it is connected to the frame of the tractor adjacent the front end thereof as at 25.

The poston rods 18 are retracted when the implement 2 is in lowered working position as in Fig. 1. To adjust the implement 2 upwardly, the power cylinders 16 are actuated simultaneously through the medium of a fluid pressure system including feed conduits 26; such system being energized from the tractor engine and including an operator controlled hand valve (not shown).

When the cylinders are actuated, the rods advance upwardly causing the cables to elevate the implement 2 with an equal lift on opposite sides thereof. With this arrangement an effective control of vertical adjustment of the implement is attained.

For use of the tractor without implement 2, or with a different front end implement, the clevis 22 is detached from each ear 23 by pulling pins 24, and the push beam couplings 6 are disconnected from trunnions 7. Thereafter the tractor 1 merely backs out of the implement; the free ends of cables 21 being tied to some convenient point on the tractor if it is not to be used with another front end implement.

The radiator 14 of the tractor is protected by a grill 27 formed in rigid unitary relation with and extending between the upstanding plates 13; the grill being heavy duty and stabilizing said plates.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful and upon which Letters Patent is desired:

In a machine of the class described, a tractor, a hoist means on the tractor, said hoist means consisting of a cross beam secured to the forward end of the tractor frame and projecting to each side thereof to form a supporting base outwardly from each side of such tractor frame, an upstanding plate on each such base positioned closely adjacent to each side of the radiator frame of the tractor, an upstanding hydraulic cylinder anchored to each base and clamped to one of said plates adjacent its upper end, a piston rod projecting vertically from each cylinder, a sheave fixed to the top of each cylinder, and a cable extending over each sheave, one end of each cable being anchored to the tractor frame, and means to admit fluid pressure to each cylinder.

ALBERT G. GURRIES.

REFERENCES CITED

The following references are of record in the file of this patent:

UNITED STATES PATENTS

| Number | Name | Date |
|---|---|---|
| 1,890,228 | Miller | Dec. 6, 1932 |
| 2,057,326 | Coates | Oct. 13, 1936 |
| 2,117,561 | McMaster | May 17, 1938 |
| 2,146,807 | Ferari | Feb. 14, 1939 |
| 2,334,374 | Austin | Nov. 16, 1943 |
| 2,375,801 | Le Tourneau | May 14, 1945 |
| 2,385,512 | Heath | Sept. 25, 1945 |
| 2,393,299 | Denning | Jan. 22, 1946 |
| 2,403,808 | Laughead | July 9, 1946 |